US012718144B2

(12) United States Patent
Lavid Ben Lulu et al.

(10) Patent No.: US 12,718,144 B2
(45) Date of Patent: Aug. 25, 2026

(54) SYSTEM AND METHOD FOR VALIDATING UNSUPERVISED MACHINE LEARNING MODELS

(71) Applicant: Aktiebolaget SKF, Gothenburg (SE)

(72) Inventors: David Lavid Ben Lulu, Yokneam Illit (IL); Eitan Vesely, Kfar-Vradim (IL)

(73) Assignee: Aktiebolaget SKF, Gothenburg (SE)

( * ) Notice: Subject to any disclaimer, the term of this patent is extended or adjusted under 35 U.S.C. 154(b) by 1052 days.

(21) Appl. No.: 17/806,368

(22) Filed: Jun. 10, 2022

(65) Prior Publication Data

US 2022/0300857 A1 Sep. 22, 2022

Related U.S. Application Data

(63) Continuation of application No. 16/007,592, filed on Jun. 13, 2018, now Pat. No. 11,403,551, which is a (Continued)

(51) Int. Cl.
*G06N 20/00* (2019.01)
*G05B 13/02* (2006.01)
*G07C 3/00* (2006.01)

(52) U.S. Cl.
CPC .......... *G06N 20/00* (2019.01); *G05B 13/027* (2013.01); *G07C 3/00* (2013.01)

(58) Field of Classification Search
None
See application file for complete search history.

(56) References Cited

U.S. PATENT DOCUMENTS 5,566,092 A 10/1996 Wang et al.
6,343,261 B1 1/2002 Iwanowski et al.
(Continued)

FOREIGN PATENT DOCUMENTS

WO 2002018879 A1 3/2002
WO 2014145977 A1 9/2014
WO 2015104691 A3 11/2015

OTHER PUBLICATIONS

The International Search Report and The Written Opinion for PCT/US2016/065115, ISA/RU, Moscow, Russia, Date of Mailing: Mar. 16, 2017.

(Continued)

*Primary Examiner* — David R Vincent
(74) *Attorney, Agent, or Firm* — M&B IP Analysts, LLC

(57) ABSTRACT

A system and method for validating unsupervised machine learning models. The method includes: analyzing, via unsupervised machine learning, a plurality of sensory inputs associated with a machine, wherein the unsupervised machine learning outputs at least one normal behavior pattern of the machine; generating, based on the at least one normal behavior pattern, at least one artificial anomaly, wherein each artificial anomaly deviates from the at least one normal behavior pattern; injecting the at least one artificial anomaly into the plurality of sensory inputs to create an artificial dataset; and analyzing the artificial dataset to determine whether a candidate model is a valid representation of operation of the machine, wherein analyzing the artificial dataset further comprises running the candidate model using the artificial dataset as an input.

19 Claims, 8 Drawing Sheets

Related U.S. Application Data continuation of application No. PCT/US2017/012708, filed on Jan. 9, 2017.

(60) Provisional application No. 62/276,875, filed on Jan. 10, 2016.

(56) References Cited

U.S. PATENT DOCUMENTS

| | | | |
|---|---|---|---|
| 6,983,210 | B2 | 1/2006 | Matsubayashi et al. |
| 6,993,417 | B2 | 1/2006 | Osann |
| 7,276,915 | B1 | 10/2007 | Euler et al. |
| 7,317,404 | B2 | 1/2008 | Cumeralto et al. |
| 7,346,433 | B2 | 3/2008 | Budike |
| 7,423,546 | B1 | 9/2008 | Aisa |
| 7,451,017 | B2 | 11/2008 | McNally |
| 7,460,930 | B1 | 12/2008 | Howell et al. |
| 7,463,986 | B2 | 12/2008 | Hayes |
| 7,605,698 | B2 | 10/2009 | Moriwaki |
| 7,840,383 | B2 | 11/2010 | Wang |
| 8,255,090 | B2 | 8/2012 | Frader-Thompson et al. |
| 8,468,380 | B2 | 6/2013 | Munjal et al. |
| 8,644,166 | B2 | 2/2014 | Xia et al. |
| 8,649,987 | B2 | 2/2014 | Steenberg et al. |
| 8,665,061 | B2 | 3/2014 | Kagan et al. |
| 2002/0091972 | A1 | 7/2002 | Harris et al. |
| 2009/0006295 | A1 | 1/2009 | Angell et al. |
| 2009/0259664 | A1* | 10/2009 | Murthy .................... G06N 5/04 |
| 2011/0035338 | A1 | 2/2011 | Kagan et al. |
| 2012/0290879 | A1 | 11/2012 | Shibuya et al. |
| 2013/0060524 | A1 | 3/2013 | Liao |
| 2015/0313529 | A1 | 11/2015 | Nevo et al. |
| 2016/0078771 | A1* | 3/2016 | Zhuang .................... G09B 5/00 434/236 |
| 2016/0241552 | A1* | 8/2016 | Lindemann ........... H04L 9/3231 |
| 2017/0061322 | A1* | 3/2017 | Chari .................. H04L 63/1425 |
| 2017/0063894 | A1* | 3/2017 | Muddu ............... H04L 63/1408 |
| 2017/0126718 | A1* | 5/2017 | Baradaran ........... H04L 63/0281 |

OTHER PUBLICATIONS

The International Search Report and The Written Opinion for PCT/US2017/012306, ISA/RU, Moscow, Russia, Date of Mailing: Apr. 20, 2017.

The International Search Report and The Written Opinion for PCT/US2017/012833, ISA/RU, Moscow, Russia, Date of Mailing: Apr. 13, 2017.

The International Search Report and Written Opinion of PCT/US2017/012708, ISA/RU, Moscow, Russia, Date of Mailing: Mar. 16, 2017.

* cited by examiner

SYSTEM AND METHOD FOR VALIDATING UNSUPERVISED MACHINE LEARNING MODELS

CROSS-REFERENCE TO RELATED APPLICATIONS

This application is a continuation of U.S. Non-Provisional application Ser. No. 16/007,592 filed on Jun. 13, 2018, now pending, which is a continuation of International Application No. PCT/US2017/012708 filed Jan. 9, 2017 which claims the benefit of U.S. Provisional Application No. 62/276,875 filed on Jan. 10, 2016, the contents of which are hereby incorporated by reference.

TECHNICAL FIELD

The present disclosure relates generally to maintenance systems for machines, and more specifically to validating behavioral models utilized for unsupervised learning of machine operation.

BACKGROUND

Communications, processing, cloud computing, artificial intelligence, and other computerized technologies have advanced significantly in recent years, heralding in new fields of technology and production. Further, many of the industrial technologies employed since or before the 1970s are still used today. Existing solutions related to these industrial technologies have typically seen minor improvements, thereby increasing production and yield only slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs when a machine deviates from correct service. Errors, which are typically deviations from the correct state of the machine, are not necessarily failures, but may lead to and indicate potential future failures. Besides failures, errors may otherwise cause unusual machine behavior that may affect performance.

The average failure-based machine downtime for typical manufacturers (i.e., the average amount of time in which production shuts down, either in part or in whole, due to machine failure) is 17 days per year, i.e., 17 days of lost production and, hence revenue. In the case of a typical 450 megawatt power turbine, for example, a single day of downtime can cost a manufacturer over $3 million US in lost revenue. Such downtime may have additional costs related to repair, safety precautions, and the like.

In energy power plants, billions of US dollars are spent annually on ensuring reliability. Specifically, billions of dollars are spent on backup systems and redundancies utilized to minimize production downtimes. Additionally, monitoring systems may be utilized to identify failures quickly, thereby speeding up the return to production when downtime occurs. However, existing monitoring systems typically identify failures only after or immediately before downtime begins.

Further, existing solutions for monitoring machine failures typically rely on a set of predetermined rules for each machine. These rules sets do not account for all data that may be collected with respect to the machine, and may only be used for checking particular key parameters while ignoring the rest. Moreover, these rules sets must be provided in advance by engineers or other human analysts. As a result, only some of the collected data may be actually used by existing solutions, thereby resulting in wasted use of computing resources related to transmission, storage, and processing of unused data. Further, failure to consider all relevant data may result in missed or otherwise inaccurate determination of failures.

Additionally, existing solutions often rely on periodic testing at predetermined intervals. Thus, even existing solutions that can predict failures in advance typically return requests to perform machine maintenance even when the machine is not in immediate danger of failing. Such premature replacement results in wasted materials and expenses spent replacing parts that are still functioning properly. Further, such existing solutions often determine failures only after failure occurs. As a result, such failures may not be prevented, resulting in down time and lost revenue.

Further, existing monitoring and maintenance solutions often require dedicated testing equipment. Consequently, these solutions typically require specialized operators who are well-trained in the operation of each monitoring and maintenance system. Requiring specialized operators can be inconvenient and costly, and may introduce potential sources of human error. Additionally, given the sheer amount of data that may be collected for any given machine in addition to minute fluctuations in data, a human analyst is not capable of adequately determining upcoming failures.

Moreover, existing solutions for monitoring machine performance are typically configured to only monitor particular types of machines and/or sensors. As a result, such existing monitoring solutions cannot be utilized for other types of machines and sensors. Further, any changes to a machine and/or its sensors (e.g., replacing a machine with a different type of machine, replacing an engine of a machine with a different engine, etc.) may result in inaccurate monitoring using such existing solutions.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for validating unsupervised machine learning models. The method comprises: analyzing, via unsupervised machine learning, a plurality of sensory inputs associated with a machine, wherein the unsupervised machine learning outputs at least one normal behavior pattern of the machine; generating, based on the at least one normal behavior pattern, at least one artificial anomaly, wherein each artificial anomaly deviates from the at least one normal behavior pattern; injecting the at least one artificial anomaly into the plurality of sensory inputs to create an artificial dataset; and analyzing the artificial dataset to determine whether a candidate model is a valid representation of operation of the machine, wherein analyzing the artificial dataset further comprises running the candidate model using the artificial dataset as an input.

Certain embodiments disclosed herein also include a non-transitory computer readable medium having stored thereon instructions for causing a processing circuitry to perform a process, the process comprising: analyzing, via unsupervised machine learning, a plurality of sensory inputs associated with a machine, wherein the unsupervised machine learning outputs at least one normal behavior pattern of the machine; generating, based on the at least one normal behavior pattern, at least one artificial anomaly, wherein each artificial anomaly deviates from the at least one normal behavior pattern; injecting the at least one artificial anomaly into the plurality of sensory inputs to create an artificial dataset; and analyzing the artificial dataset to determine whether a candidate model is a valid representation of operation of the machine, wherein analyzing the artificial dataset further comprises running the candidate model using the artificial dataset as an input.

Certain embodiments disclosed herein also include a system for validating unsupervised machine learning models. The system comprises: a processing circuitry; and a memory, the memory containing instructions that, when executed by the processing circuitry, configure the system to: analyze, via unsupervised machine learning, a plurality of sensory inputs associated with a machine, wherein the unsupervised machine learning outputs at least one normal behavior pattern of the machine; generate, based on the at least one normal behavior pattern, at least one artificial anomaly, wherein each artificial anomaly deviates from the at least one normal behavior pattern; inject the at least one artificial anomaly into the plurality of sensory inputs to create an artificial dataset; and analyze the artificial dataset to determine whether a candidate model is a valid representation of operation of the machine, wherein analyzing the artificial dataset further comprises running the candidate model using the artificial dataset as an input.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
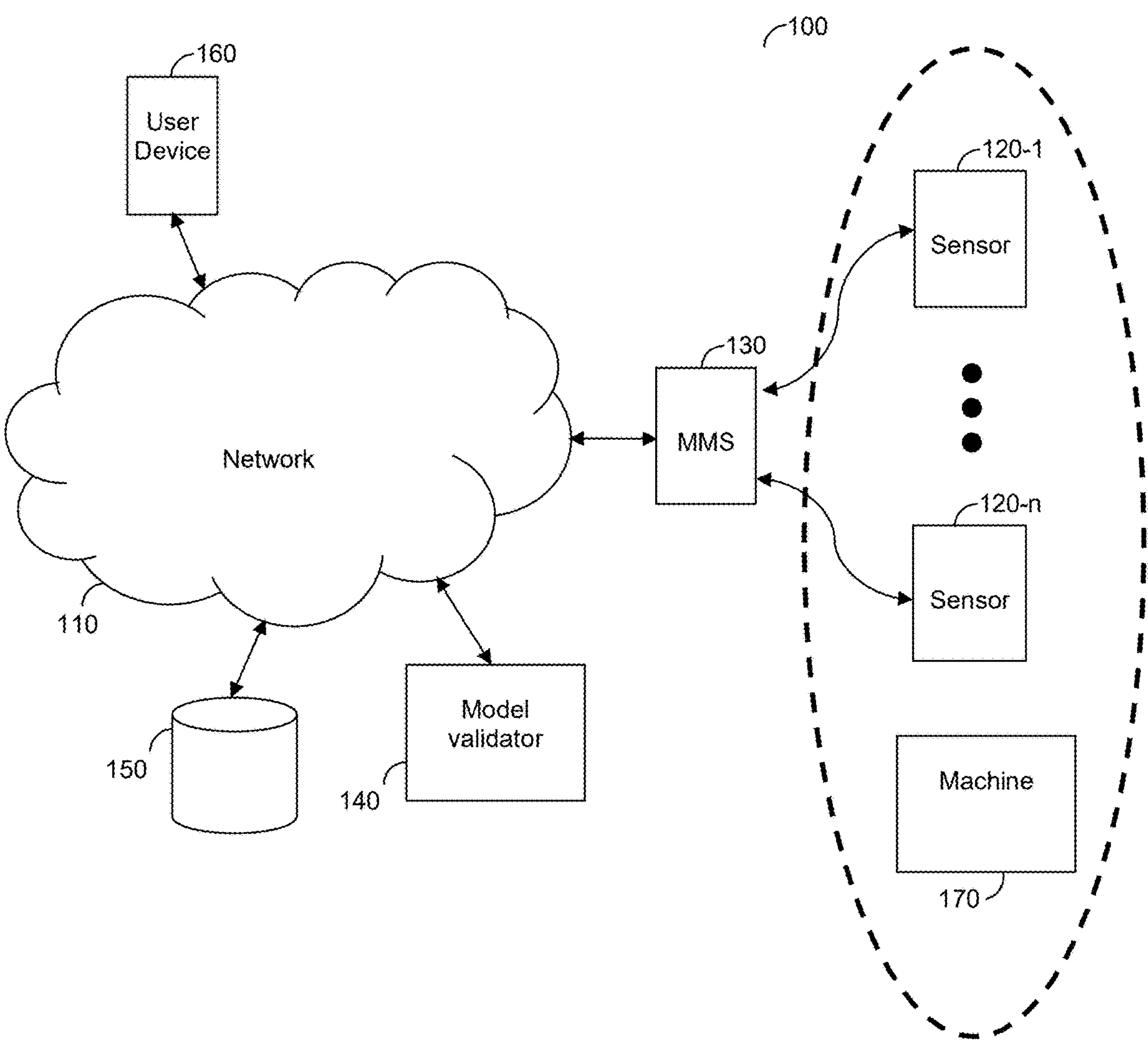
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for validating a behavioral model of a machine. Sensory inputs associated with a machine and a candidate model to be validated are obtained. The sensory inputs are analyzed via unsupervised machine learning to determine at least one normal behavior pattern. Based on the analysis, at least one artificial anomaly is generated and injected into the sensory inputs to create an artificial dataset. Each artificial anomaly deviates from the at least one normal behavior pattern. The candidate model is run using the artificial dataset as an input to detect anomalies. Based on the results of running the candidate model on the artificial dataset, it is determined whether the candidate model is a valid representation of operation of the machine.

The unsupervised machine learning analysis may further include modeling the sensory inputs and detecting indicators in the sensory inputs. The modeling may include generating meta-models for each component, module, or portion of the machine. The meta-models are monitored to detect indicators therein. Based on the indicators, anomalies may be detected.

FIG. 1 shows an example network diagram 100 utilized to describe the various disclosed embodiments. The example network diagram 100 includes a machine monitoring system (MMS) 130, a model validator 140, a database 150, and a user device 160 communicatively connected via a network 110. The example network diagram 100 further includes a plurality of sensors 120-1 through **120-*n* (hereinafter referred to individually as a sensor 120 and collectively as sensors 120, merely for simplicity purposes), communicatively connected to the machine monitoring system 130. The network 110** may be, but is not limited to, a wireless, a cellular or wired network, a local area network (LAN), a wide area network (WAN), a metro area network (MAN), the Internet, the worldwide web (WWW), similar networks, and any combination thereof.

The user device 160 may be, but is not limited to, a personal computer, a laptop, a tablet computer, a smartphone, a wearable computing device, or any other device capable of receiving and displaying notifications indicating results of root cause analysis, results of unsupervised analysis of machine operation data, or both.

The sensors 120 are located in proximity (e.g., physical proximity) to a machine 170. The machine 170 may be any machine for which performance can be represented via sensory data such as, but not limited to, a turbine, an engine, a welding machine, a three-dimensional (3D) printer, an injection molding machine, a combination thereof, a portion thereof, and the like. Each sensor 120 is configured to collect sensory inputs such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be, but are not necessarily, communicatively or otherwise connected to the machine 170 (such connection is not illustrated in FIG. 1 merely for the sake of simplicity and without limitation on the disclosed embodiments).

The sensors 120 may be in proximity to the machine 170 if, e.g., each sensor 120 is within a predetermined threshold proximity distance from the machine or otherwise deployed such that the sensor can capture sensory signals related to machine operation. As a non-limiting example, the sensor 120-3 may be proximate to the machine 170 if it is within 2 feet of the machine 170. As another non-limiting example, a sound sensor 120-4 may be proximate to the machine 170 if the sound sensor 120-4 is close enough to the machine 170 to capture sounds with at most a threshold amount of noise, distortion, or both.

The sensors 120 are communicatively connected to the machine monitoring system 130. The machine monitoring system 130 may be configured to store and to preprocess sensory inputs received from the sensors 120. Alternatively or collectively, the machine monitoring system 130 may be configured to periodically retrieve collected sensory inputs stored in, for example, the database 150. The preprocessing may include, but is not limited to, timestamping sensory inputs, de-trending, rescaling, noise filtering, a combination thereof, and the like.

The preprocessing may further include feature extraction. The results of the feature extraction may include features to be utilized by the model validator 140 during unsupervised machine learning in order to, e.g., determine normal behavior patterns, detect anomalies, and the like. The feature extraction may include, but is not limited to, dimension reduction techniques such as, but not limited to, singular value decompositions, discrete Fourier transformations, discrete wavelet transformations, line segment methods, or a combination thereof. When such dimension reduction techniques are utilized, the preprocessing may result in, e.g., a lower-dimensional space for the sensory inputs. The machine monitoring system 130 is configured to send the preprocessed sensory inputs to the model validator 140.

In an embodiment, the model validator 140 is configured to receive, via the network 110, the preprocessed sensory inputs associated with the machine 170 from the machine monitoring system 130. The sensory inputs may be received continuously, and may be received in real-time.

In an embodiment, the model validator 140 may further store the sensory input data received from the machine monitoring system 130. Alternatively or collectively, the sensory input data may be stored in the database 150. The database 150 may further store sensory inputs (raw, preprocessed, or both) collected from a plurality of other sensors (not shown) associated with other machines (also not shown). The database 150 may further store indicators, anomalous patterns, failure predictions, behavioral models utilized for analyzing sensory input data, or a combination thereof.

In an embodiment, the model validator 140 is configured to receive the preprocessed sensory inputs and a candidate model to be validated. The model validator 140 may be configured to analyze the sensory inputs to determine at least one normal behavior pattern. Based on the determined normal behavior patterns, the model validator 140 is configured to generate at least one artificial anomaly. Each artificial anomaly includes at least one data point (e.g., a sensory input value and a corresponding time value) that deviates from at least one of the normal behavior patterns. The at least one artificial anomaly is generated at least partially based on randomized values for, e.g., time and magnitude. The model validator 140 is configured to inject the generated artificial anomalies into the sensory inputs to create an artificial dataset.

In an embodiment, the model validator 140 is configured to analyze the artificial dataset. To this end, the model validator 140 may be further configured to run the candidate model using data of the artificial dataset as inputs. Based on the analysis, the model validator 140 is configured to determine whether the candidate model is valid. Determining whether the candidate model is valid may include, but is not limited to, generating a score indicating an accuracy of detecting anomalies of the candidate model. In a further embodiment, when it is determined that the candidate model is not valid, a new model may be selected.

In an embodiment, the model validator 140 is configured to analyze the preprocessed sensory inputs or at least a portion thereof via unsupervised machine learning. In a further embodiment, the unsupervised machine learning may include one or more signal processing techniques, implementation of one or more neural networks, or both. It should be noted that different parameters represented by the sensory inputs may be analyzed using different machine learning techniques. For example, a temperature parameter may be analyzed by applying a first machine learning technique to sensory inputs from a temperature sensor, and an energy consumption parameter may be analyzed by applying a second machine learning technique to sensory inputs from an energy consumption gage.

In an embodiment, the model validator 140 may be configured to automatically select at least one optimal method for detecting indicators in the sensory input data based on, e.g., a type of one or more portions of the data. In a further embodiment, the selection may be based on results from applying a plurality of models to each at least a portion of the sensory input data. In yet a further embodiment, the selection may be based further on a number of false positives in the results.

In a further embodiment, the model validator 140 is configured to generate a meta-model for at least one portion of the machine 170. Each portion of the machine for which a meta-model is generated may be a component or module (not shown) such as, but not limited to, a pipe, an engine, a portion of an engine, a combination thereof, and the like. Generating a meta-model may include, but is not limited to, selecting a model that optimally indicates anomalies in the sensory inputs for each of the at least one portion of the machine 170. Each of the generated meta-models is utilized to detect anomalies in the behavior of the respective portion of the machine 170.

Utilization of meta-models representing different portions or components of the machine may aid in more accurately or more precisely representing machine operation. As a non-limiting example, meta-models for a compressor and for a turbine of a gas turbine machine may be utilized to determine anomalies specific to either the compressor or the turbine.

In an embodiment, the model validator 140 is configured to generate, in real-time, at least one adaptive threshold for detecting anomalies based on the analysis. In a further embodiment, the model validator 140 is configured to determine, in real-time, normal behavior patterns for the sensory inputs of the machine 170 or each portion thereof. The adaptive thresholds may be generated based on the determined normal behavior patterns. Each adaptive threshold is a threshold utilized to determine anomalies that may change over time in accordance with the normal behavior patterns. As a non-limiting example, the adaptive threshold may increase and decrease proportionally to increases and decreases in the normal behavior patterns, respectively. Generation of adaptive thresholds for detecting anomalies based on normal behavior patterns is described further herein below with respect to FIGS. 3A and 3B.

In an embodiment, based on the detected anomalies, suspected errors may be determined. In a further embodiment, when a suspected error is determined, the model validator 140 may be configured to generate a notification indicating anomalous activity. In a further embodiment, the model validator 140 is further configured to send the generated notification to, e.g., the user device 160. Alternatively or collectively, the model validator 140 may be configured to send the notification to a system (not shown) configured to automatically mitigate failures.

It should be noted that the machine monitoring system 130 is shown in FIG. 1 as a separate component from the model validator 140 merely for simplicity purposes and without limitation on the disclosed embodiments. The machine monitoring system 130 may be incorporated in the model validator 140 so as to allow the model validator 140 to obtain and preprocess sensory inputs without departing from the scope of the disclosure.

It should also be noted that the embodiments described herein above with respect to FIG. 1 are discussed with respect to a user device 160 and a machine 170 merely for simplicity purposes and without limitation on the disclosed embodiments. Multiple user devices may receive information related to root causes machine failures without departing from the scope of the disclosure. Additionally, sensory inputs related to multiple machines may be collected to determine root causes of failures of any or all of the machines without departing from the scope of the disclosure.

It should be further noted that the embodiments disclosed herein are not limited to the specific architecture illustrated in FIG. 1 and other architectures may be equally used without departing from the scope of the disclosed embodiments. Specifically, the model validator 140 may reside in a cloud computing platform, a datacenter, on premises, and the like. Moreover, in an embodiment, there may be a plurality of model validators operating as described hereinabove and configured to either have one as a standby proxy to take control in a case of failure, to share the load between them, or to split the functions between them.

Figure 2:
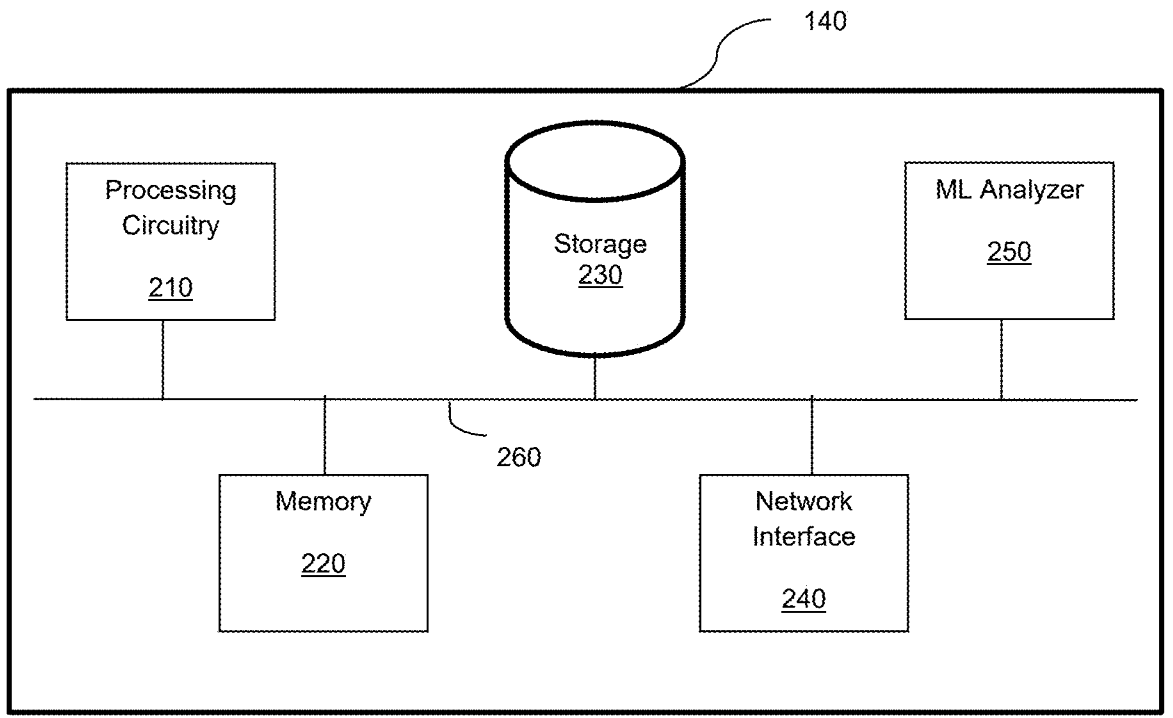
FIG. 2 is a schematic diagram of a machine maintenance system according to an embodiment.

FIG. 2 shows an example block diagram of the model validator 140 implemented according to one embodiment. The model validator 140 includes a processing circuitry 210 coupled to a memory 220, a storage 230, a network interface 240, and a machine learning (ML) analyzer 250. In an embodiment, the components of the model validator 140 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform unsupervised root cause analysis of machine failures as described herein.

The storage 230 may be magnetic storage, optical storage, and the like, and may be realized, for example, as flash memory or other memory technology, CD-ROM, Digital Versatile Disks (DVDs), or any other medium which can be used to store the desired information.

The network interface 240 allows the model validator 140 to communicate with the machine monitoring system 130 for the purpose of, for example, receiving preprocessed sensory inputs. Additionally, the network interface 240 allows the model validator 140 to communicate with the user device 160 in order to send, e.g., notifications related to root causes of machine failures, recommendations for avoiding failures, and the like.

The machine learning analyzer 250 is configured to perform unsupervised machine learning based on sensory inputs received via the network interface 240 as described further herein. In an embodiment, the machine learning analyzer 250 is further configured to validate, based on the unsupervised machine learning, candidate models. In another embodiment, the machine learning analyzer 250 may also be configured to analyze preprocessed sensory inputs to determine behavior patterns.

It should be understood that the embodiments described herein are not limited to the specific architecture illustrated in FIG. 2, and other architectures may be equally used without departing from the scope of the disclosed embodiments.

Figure 3A:
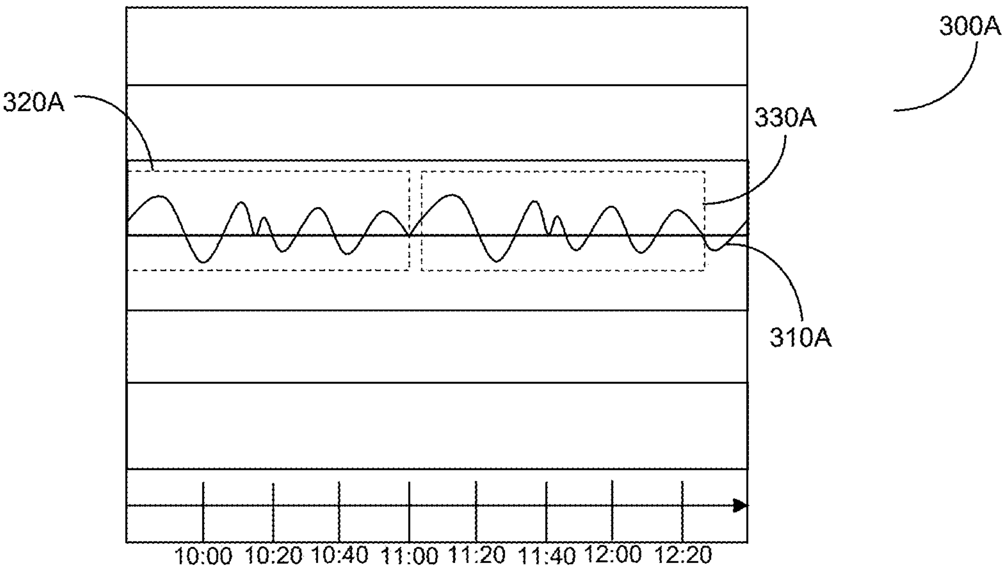
FIGS. 3A and 3B are simulations illustrating modeling of sensory inputs.

FIG. 3A is an example simulation illustrating determining behavior patterns. The simulation shown in FIG. 3A includes a graph 300A in which sensory inputs are represented by a curve 310A. In the example simulation shown in FIG. 3, the curve 310A represents an aggregated behavior of the sensory inputs over time. During operation of a machine (e.g., the machine 170, FIG. 1), the aggregated behavior represented by the curve 310A may be continuously monitored for repeated sequences such as repeated sequences 320A and 330A. Upon determination of, for example, the repeated sequence 320A, the repeated sequence 330A, or both, a model of a normal behavior pattern of the machine is generated. It should be noted that continuous monitoring of, e.g., two or more cycles of behavior may be useful for determining more accurate patterns. As monitoring and, consequently, learning, continue, the normal behavior model may be updated accordingly. The models of normal behavior patterns may be utilized to, e.g., generate artificial anomalies for validating a machine behavioral model.

Figure 3B:
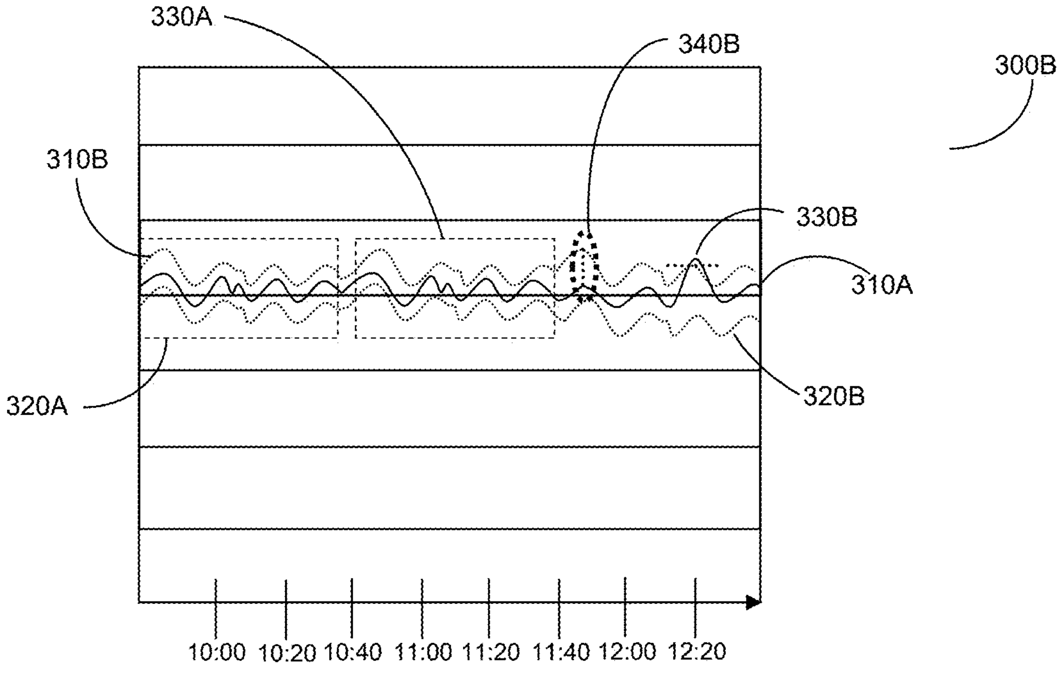

FIG. 3B is an example simulation 300B illustrating generation of adaptive thresholds. Based on one or more repeated sequences (e.g., the repeated sequences 320A and 330A), a maximum threshold 310B and a minimum threshold 320B are determined. The thresholds 310B and 320B may be determined in real-time and regardless of past machine behavior. In an example implementation, the thresholds 310B and 320B are dynamic and adapted based on the sequences 320A and 330A as well as any subsequently determined sequences. The point 330B represents an indicator, i.e., a data point that is above the maximum threshold 310B or below the minimum threshold 320B. Upon determination that one of the thresholds 310B or 320B has been exceeded, an anomaly may be detected.

Figure 4:
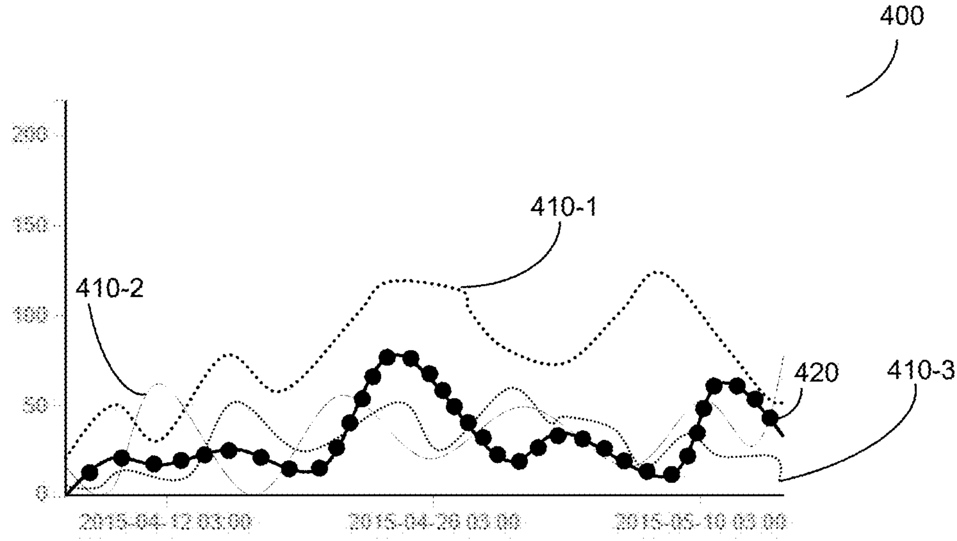
FIG. 4 is a simulation illustrating a general model of a plurality of meta-models.

FIG. 4 is an example simulation 400 illustrating generating a model of a machine based on a plurality of meta-models. In the example simulation 400, a machine (e.g., the machine 170, FIG. 1) including three components is being monitored, where the three components are represented by the meta-models 410-1, 410-2, and 410-3, respectively. The meta-models are based on sensory inputs related to their respective components, and may be utilized to identify anomalies in the operation of each respective component of the machine. Based on the meta-models 410-1 through 410-3, a model 420 that is an optimal representation of the machine may be generated.

Figure 5:
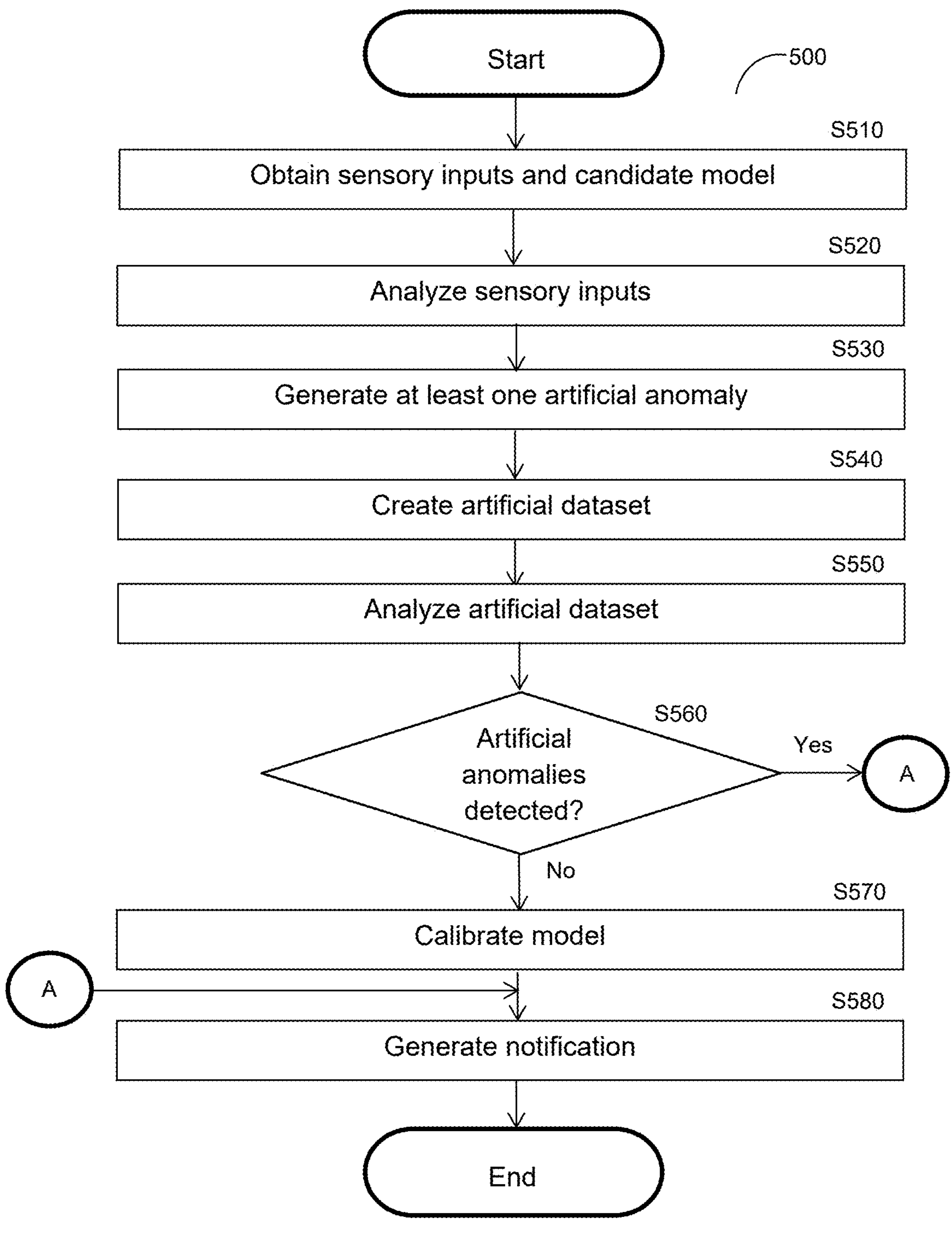
FIG. 5 is a flowchart illustrating a method for validating models according to an embodiment.

FIG. 5 is an example flowchart 500 illustrating a method for validating a behavioral model for unsupervised learning of machine operations according to an embodiment. In an embodiment, the method may be performed by the model validator 140. The method may be performed when, e.g., the model will be run, when new data is received (e.g., after a predetermined threshold of sensory inputs has been received since a previous validation), periodically at regular time intervals, after a change in the machine (e.g., replacing the machine or a component thereof), a combination thereof, and the like. Accordingly, the method may be utilized to ensure that models applied to the machine are currently appropriate.

At S510, a plurality of sensory inputs associated with a machine and a candidate model to be validated are obtained. The associated sensory inputs may be or may be based on, but are not limited to, sensory signals captured by sensors that are proximate (e.g., physically) to the machine. Such sensors may be proximate to a machine if, e.g., each sensor is within a predetermined threshold proximity distance from the machine or otherwise deployed such that the sensor can capture sensory signals related to operation of the machine. The obtained sensory inputs may be received from, e.g., the sensors in proximity to the machine, or may be retrieved from, e.g., a storage. In an embodiment, the obtained sensory inputs are preprocessed. The preprocessed sensory inputs include features to be utilized as inputs for unsupervised machine learning.

In another embodiment, the obtained sensory inputs may be received or retrieved as raw sensory data. In a further embodiment, S510 may include preprocessing the raw data. In yet a further embodiment, S510 may further include retrieving raw sensory data, and extracting features from the raw sensory data. The extracted features may include, but are not limited to, a reduced-dimension subset of the raw sensory data. In another embodiment, S510 may further include de-trending, rescaling, noise filtering, or a combination thereof.

At S520, the preprocessed sensory inputs are analyzed to determine at least one normal behavior pattern. The analysis may include, but is not limited to, unsupervised machine learning using the preprocessed sensory inputs. The outputs of the unsupervised machine learning process include the at least one normal behavior pattern.

In a further embodiment, S520 also includes generating at least one adaptive threshold based on the at least one normal behavior pattern. The adaptive thresholds may be utilized to, e.g., determine whether data deviates from the at least one normal behavior pattern. Each adaptive threshold is a threshold having values that are different at, e.g., different times. Thus, the adaptive thresholds may represent, for example, upper bounds, lower bounds, or both, used to determine whether at least some sensory inputs are anomalies. As a non-limiting example, an adaptive threshold may represent a lower bound of non-anomalous data such that a sensory input below the value of the adaptive threshold at a given time is determined to be an anomaly. Example adaptive thresholds are described further herein above with respect to FIG. 3B.

At S530, based on the determined normal behavior patterns, at least one artificial anomaly is generated. Each artificial anomaly includes at least one data point that deviates from the determined normal behavior patterns. To this end, each artificial anomaly may be, but is not limited to, at least one data point exceeding one or more adaptive thresholds, at least one data point that does not match any of the normal behavior patterns, and the like.

In an embodiment, each artificial anomaly is generated using randomized values for, e.g., time of injection, magnitude of the anomaly, and the like. Further, the number of anomalies to be injected may be randomized. The magnitude of an anomaly may be, for example, a value representing the difference between the sensory input value of the anomaly and a preprocessed sensory input received at the randomized time of injection of the anomaly. The magnitude may be based on, e.g., a standard deviation of the normal behavior pattern. As a non-limiting example, the magnitude of an anomaly may be randomized to be between 1.5 to 4.5 times the standard deviation of the normal behavior pattern, and is added or subtracted from the value of the sensory input received at the corresponding randomized time of injection to generate one of the artificial anomalies.

At S540, the generated artificial anomalies are injected into the obtained sensory inputs to create an artificial dataset.

At S550, the artificial dataset is analyzed to detect anomalies. The analysis may include, but is not limited to, unsupervised machine learning running the candidate model and using data of the artificial dataset as inputs. The outputs of the unsupervised machine learning process include anomalies. In a further embodiment, S550 may include generating a periodic anomalies map of the detected anomalies. In another embodiment, S550 may further include generating, in real-time, at least one adaptive threshold. The generated adaptive thresholds may be utilized to determine anomalous data points. Detecting anomalies based on sensory inputs is described further herein below with respect to FIG. 6.

At S560, it is determined whether the injected artificial anomalies were detected using the candidate model and, if so, execution continues with S580; otherwise, execution continues with S570. In an embodiment, S560 may include running the candidate model or sending, to a machine learning system, the artificial dataset and the candidate model, and receiving, from the machine learning system, results of the analysis. In a further embodiment, S560 may include determining whether an alert was generated with respect to the injected artificial anomalies, whether analytics were generated with respect to the injected artificial anomalies, and the like.

In an embodiment, the candidate model may be determined to be a valid model for representing behavior of a machine or a component of a machine if the injected artificial anomalies were detected using the candidate model. Such validation may be utilized for, e.g., ensuring that models utilized for machine learning of behavior of a machine remain appropriate. Machine learning models utilized to represent machine behavior may become less appropriate over time as, e.g., the machine ages (i.e., is subject to wear), machine parts or components are replaced, and the like. Validating such models may be utilized to identify inaccurate models, thereby allowing for updating (e.g., by using a new, more accurate model) of the models as machine behavior changes.

In an embodiment, S560 may include determining a score illustrating the accuracy of the candidate model in detecting the artificial anomalies. The score may be based on, but is not limited to, the number of injected anomalies, the number of detected anomalies, the magnitudes of injected anomalies (i.e., failure to detect anomalies with greater magnitudes may be more indicative of the model being invalid than failure to detect anomalies with lower magnitudes), a combination thereof, and the like. The score may be further based on comparison of results of the unsupervised learning using the candidate model with those of one or more other models such that the score may represent a relative measure of accuracy of the candidate model. In a further embodiment, S560 may include determining whether at least an anomaly detection threshold was met. The anomaly detection threshold may be, but is not limited to, a minimum score.

At optional S570, when it is determined that the artificial anomalies were not detected, the model may be calibrated. The model calibration may include, but is not limited to, selecting a new model to be utilized, validating the selected new model, a combination thereof, and the like.

At optional S580, a notification indicating the results of the validation may be generated. The notification may be sent to, for example, a user device (e.g., the user device 160, FIG. 1), or may be sent to a system configured to utilize validated models for machine monitoring.

The detected anomalies may include, but are not limited to, point anomalies, contextual anomalies, and collective anomalies. A point anomaly includes a single data point that is above or below a threshold (e.g., an adaptive threshold as described herein above with respect to FIGS. 3A and 3B) difference with respect to all other data points. A contextual anomaly includes one or more data points that deviate from normal behavior within a given context (e.g., a particular period of time). A collective anomaly includes a plurality of data points that deviate from normal behavior of other groupings of data points. Any of the detected anomalies may include one or more of the injected anomalies. As a non-limiting example, the injected anomalies may include a plurality of point anomalies, with a detected anomaly being a collective anomaly including 3 of the injected point anomalies.

Figure 6:
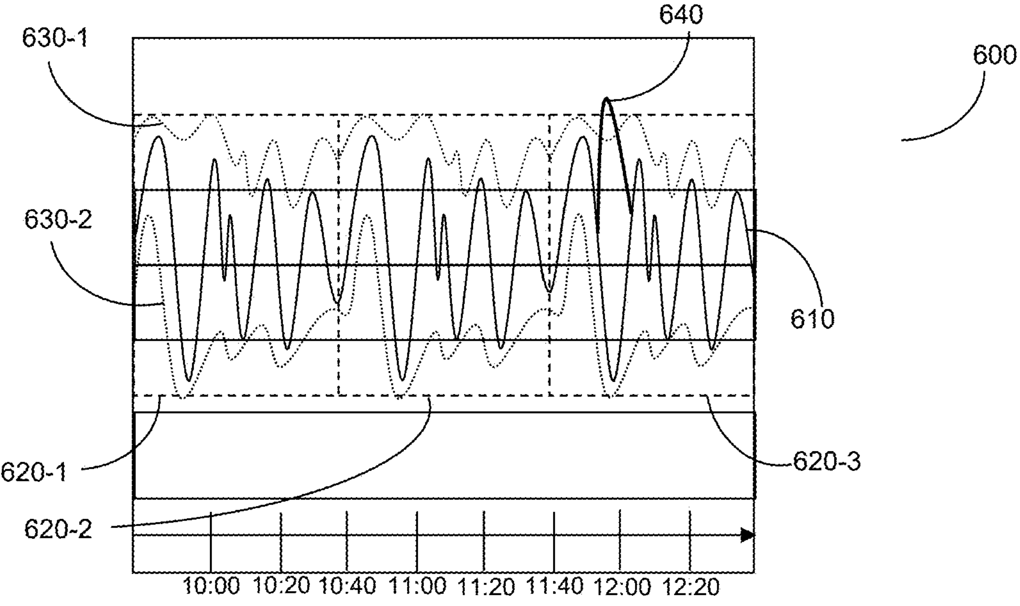
FIG. 6 is a simulation illustrating injecting artificial anomalies to validate a candidate model.

FIG. 6 is an example simulation illustrating injecting artificial anomalies to validate a candidate model. A graph 600 is shown in which sensory input data is represented via a curve 610. The curve 610 represents an aggregated behavior of the sensory inputs over time. The curve 610 may represent, e.g., raw data, preprocessed data, and the like. The curve 610 is monitored over time, and normal behavior patterns 620-1, 620-2, and 620-3 are determined. A candidate model to be validated is represented by the curves 630. The curves 630 illustrate, e.g., the adaptive thresholds for normal behavior of the candidate model. Based on the normal behavior patterns 620, an artificial anomaly 640 is generated and injected into the curve 610. When unsupervised machine learning based on the candidate model and the curve 610 is performed, the artificial anomaly including data points of the curve 640 is detected and, therefore, the candidate model is validated. The artificial anomaly shown in FIG. 6 deviates from the normal behavior patterns at least insofar as it does not meet the adaptive thresholds represented by the curves 630. Specifically, the artificial anomaly shown in FIG. 6 exceeds the values of the upper adaptive threshold curve 630-1 during a period of time near 12:00.

It should be noted that the artificial anomaly 640 is illustrated as a positive (i.e., above the curve 610) anomaly on a particular point of the curve 610 merely for example purposes and without limitation on the disclosed embodiments. Artificial anomalies may equally include negative anomalies that dip below the curve 610. Injection of both positive and negative artificial anomalies may be useful for, e.g., testing both the upper and lower bounds (e.g., the bounds represented by the curves 630) of a candidate model.

Figure 7:
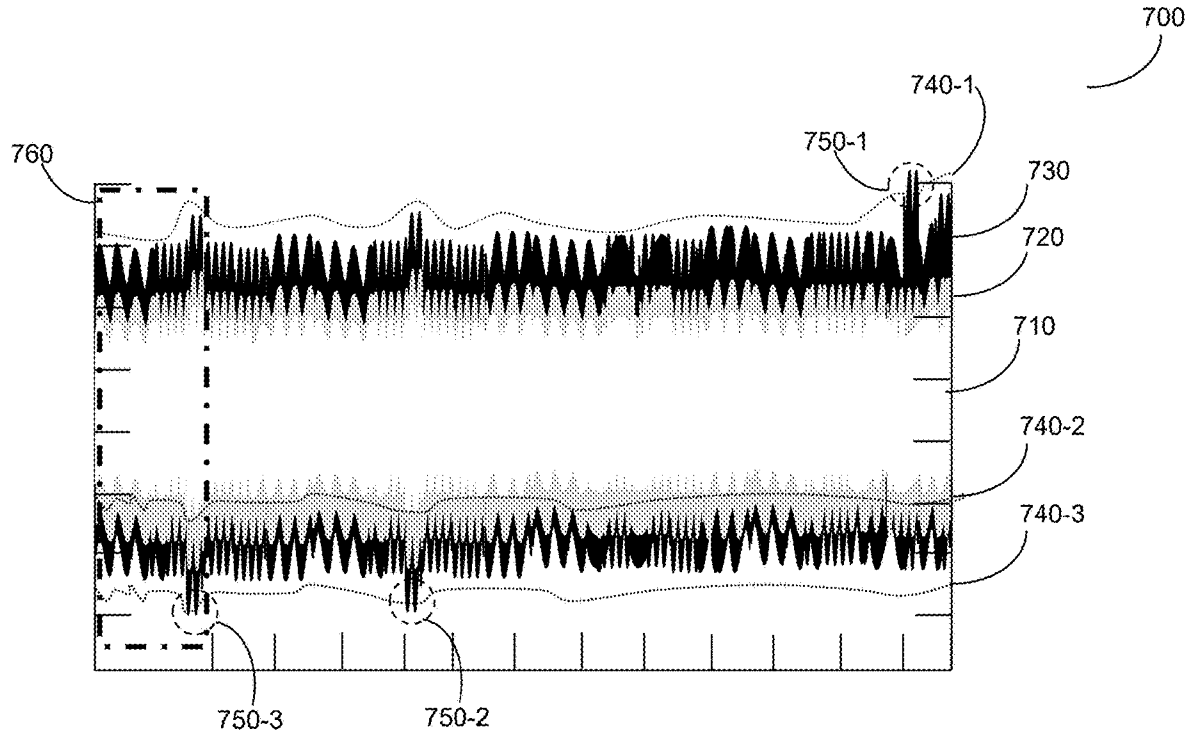
FIG. 7 is a simulation illustrating validating a candidate model representing a plurality of machines or components.

FIG. 7 is an example simulation illustrating validating a model representing a plurality of machines or components of a machine. Specifically, the simulation shown in FIG. 7 illustrates a model for a first component and a second component of a machine. The simulation includes a graph 700 illustrating inputs and models thereof related to operation of a machine including at least one component. A first data plot 710 represents sensory inputs received with respect to a component of the machine. Based on the first data plot 710, a second data plot 720 is generated, where the second data plot 720 represents operation of the machine component. Based on the second data plot 720, a third data plot 730 is generated. The third data plot 730 represents operation of the machine. It should be noted that multiple second data plots 720 may be utilized to generate the third data plot 730 when the machine includes multiple components.

Based on the data plots 710, 720, and 730, a model 740-1 of the sensory inputs, a model 740-2 of the machine component, and a model 740-3 of the machine itself. Each model 740 represents normal behavior of the respective values. Based on the models 740, artificial anomalies are generated and injected into the sensory inputs, thereby causing appearance of anomalous data point sets 750-1, 750-2, and 750-3 in the graph 700. Based on the sensory inputs including the injected artificial anomalies, it is determined whether the models 740-1 through 740-3 are valid. The validation may be further with respect to the sliding window 460 illustrating at least a portion of the sensory inputs shown in the data plots 710, 720, and 730, continuously monitored over time.

It should be noted that various embodiments are described with respect to validating a candidate model of a machine merely for simplicity purposes and without limitation on the disclosed embodiments. A candidate model for, e.g., a component or other portion of a machine may be equally validated without departing from the scope of the disclosed embodiments. Validation of such a component or portion candidate model may be based on sensory inputs associated with the component or portion of the machine. Alternatively or collectively, multiple models may be validated to determine whether the collective models validly represent machine behavior. For example, candidate models representing components of a machine as well as a candidate model representing the machine itself may be validated to ensure that the component candidate models represent the operations of the respective components, that the machine candidate model represents the operation of the machine, or both.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for validating unsupervised machine learning models, comprising:

analyzing, in real-time during operation of a machine, via unsupervised machine learning, a plurality of sensory inputs captured by sensors associated with the machine, wherein the unsupervised machine learning outputs in real-time at least one normal behavior pattern of the machine;

generating, based on the at least one normal behavior pattern, at least one artificial anomaly, wherein each artificial anomaly deviates from the at least one normal behavior pattern;

injecting the at least one artificial anomaly into the plurality of sensory inputs to create an artificial dataset; and analyzing the artificial dataset in real-time to determine whether a candidate model is a valid representation of operation of the machine, wherein analyzing the artificial dataset further comprises running the candidate model using the artificial dataset as an input.

2. The method of claim 1, further comprising:

determining, based on the analysis of the artificial dataset, a score representing an accuracy of the candidate model in detecting anomalies, wherein the candidate model is valid when the determined score is above a predetermined threshold.

3. The method of claim 1, further comprising:

selecting a new model, when it is determined that the candidate model is not valid.

4. The method of claim 1, wherein each generated artificial anomaly includes a randomized time for injection and an at least partially randomized magnitude.

5. The method of claim 1, wherein the analysis of the artificial dataset includes unsupervised machine learning, wherein the unsupervised machine learning analysis of the artificial dataset outputs at least one detected anomaly, wherein determining whether the candidate model is valid further comprises:

determining whether the at least one detected anomaly includes the at least one artificial anomaly.

6. The method of claim 1, further comprising:

preprocessing the plurality of sensory inputs associated with the machine, wherein the preprocessing includes extracting at least one feature from raw sensory data.

7. The method of claim 1, further comprising:

generating, based on the at least one normal behavior pattern, at least one adaptive threshold, wherein each artificial anomaly does not meet at least one of the at least one adaptive threshold.

8. The method of claim 7, wherein each adaptive threshold includes at least one threshold value, wherein the at least one threshold value varies over time.

9. The method of claim 1, wherein the plurality of sensory inputs associated with the machine are captured by at least one sensor in proximity to the machine, wherein each proximate sensor is within a predetermined distance of the machine.

10. A non-transitory computer readable medium having stored thereon instructions for causing a processing circuitry to perform a process for validating unsupervised machine learning models, the process comprising:

analyzing, in real-time during operation of a machine, via unsupervised machine learning, a plurality of sensory inputs captured by sensors associated with the machine, wherein the unsupervised machine learning outputs in real-time at least one normal behavior pattern of the machine;

generating, based on the at least one normal behavior pattern, at least one artificial anomaly, wherein each artificial anomaly deviates from the at least one normal behavior pattern;

injecting the at least one artificial anomaly into the plurality of sensory inputs to create an artificial dataset; and analyzing the artificial dataset in real-time to determine whether a candidate model is a valid representation of operation of the machine, wherein analyzing the artificial dataset further comprises running the candidate model using the artificial dataset as an input.

11. A system for validating unsupervised machine learning models, comprising:

a processing circuitry; and a memory, the memory containing instructions that, when executed by the processing circuitry, configure the system to:

analyze, in real-time during operation of a machine, via unsupervised machine learning, a plurality of sensory inputs captured by sensors associated with the machine, wherein the unsupervised machine learning outputs in real-time at least one normal behavior pattern of the machine via unsupervised machine learning, a plurality of sensory inputs associated with a machine, wherein the unsupervised machine learning outputs at least one normal behavior pattern of the machine;

generate, based on the at least one normal behavior pattern, at least one artificial anomaly, wherein each artificial anomaly deviates from the at least one normal behavior pattern;

inject the at least one artificial anomaly into the plurality of sensory inputs to create an artificial dataset; and analyze the artificial dataset in real-time to determine whether a candidate model is a valid representation of operation of the machine, wherein analyzing the artificial dataset further comprises running the candidate model using the artificial dataset as an input.

12. The system of claim 11, wherein the system is further configured to:

determine, based on the analysis of the artificial dataset, a score representing an accuracy of the candidate model in detecting anomalies, wherein the candidate model is valid when the determined score is above a predetermined threshold.

13. The system of claim 11, wherein the system is further configured to:

select a new model, when it is determined that the candidate model is not valid.

14. The system of claim 11, wherein each generated artificial anomaly includes a randomized time for injection and an at least partially randomized magnitude.

15. The system of claim 11, wherein the analysis of the artificial dataset includes unsupervised machine learning, wherein the unsupervised machine learning analysis of the artificial dataset outputs at least one detected anomaly, wherein the system is further configured to:

determine whether the at least one detected anomaly includes the at least one artificial anomaly.

16. The system of claim 11, wherein the system is further configured to:

preprocess the plurality of sensory inputs, wherein the preprocessing includes extracting at least one feature from raw sensory data.

17. The system of claim 11, wherein the system is further configured to:

generate, based on the at least one normal behavior pattern, at least one adaptive threshold, wherein each artificial anomaly does not meet at least one of the at least one adaptive threshold.

18. The system of claim 17, wherein each adaptive threshold includes at least one threshold value, wherein the at least one threshold value varies over time.

19. The system of claim 11, wherein the plurality of sensory inputs associated with the machine are captured by at least one sensor in proximity to the machine, wherein each proximate sensor is within a predetermined distance of the machine.

* * * * *